United States Patent [19]

Abel et al.

[11] Patent Number: 4,504,569

[45] Date of Patent: Mar. 12, 1985

[54] PHOTOGRAPHIC MATERIAL WITH A TEMPORARY BARRIER LAYER COMPRISING A CHILL-GELABLE POLYMER

[75] Inventors: Edward P. Abel, Webster; Wayne A. Bowman, Walworth, both of N.Y.

[73] Assignee: Eastman Kodak Company, Rochester, N.Y.

[21] Appl. No.: 526,761

[22] Filed: Aug. 26, 1983

[51] Int. Cl.³ .................. B31F 7/00; G03C 7/00
[52] U.S. Cl. .................. 430/214; 430/215; 430/216; 430/536; 430/537; 430/237
[58] Field of Search .............. 430/215, 216, 536, 537, 430/237, 214

[56] References Cited

U.S. PATENT DOCUMENTS

| | | | |
|---|---|---|---|
| 3,026,293 | 3/1962 | Caldwell et al. | 430/536 |
| 3,362,819 | 1/1968 | Land | 96/3 |
| 3,421,893 | 1/1969 | Taylor | 96/29 |
| 3,455,686 | 7/1969 | Farney | 96/3 |
| 3,575,701 | 4/1971 | Taylor | 96/3 |
| 4,201,587 | 5/1980 | Bedell et al. | 430/536 |
| 4,229,516 | 10/1980 | Abel | 430/215 |
| 4,288,523 | 9/1981 | Taylor | 430/523 |
| 4,297,431 | 10/1981 | Sullivan | 430/215 |
| 4,340,655 | 7/1982 | Hollister et al. | 430/536 |
| 4,356,249 | 10/1982 | Abel et al. | 430/536 |

Primary Examiner—Jack P. Brammer
Attorney, Agent, or Firm—Arthur H. Rosenstein

[57] ABSTRACT

A polymer comprising polymerized N-alkyl substituted acrylamide and a polymerized crosslinking monomer wherein the polymer has a solubility parameter from about 13 to 16 at 25° C., is useful as a temporary barrier layer between reactants in photographic products. The barrier layer is particularly useful as a process timing layer in color image transfer film units.

22 Claims, No Drawings

PHOTOGRAPHIC MATERIAL WITH A TEMPORARY BARRIER LAYER COMPRISING A CHILL-GELABLE POLYMER

BACKGROUND OF THE INVENTION

1. Field of the Invention

This invention relates to temporary barriers which delay the contact of one reactant with another reactant in photographic elements and more particularly to color diffusion transfer film units wherein one portion of the color unit is temporarily isolated from another portion by a barrier layer comprising a mixture of about 30 to 97 weight percent of polymerized N-alkyl-substituted acrylamide, about 3 to 25 weight percent polymerized crosslinking monomer having at least two addition polymerizable groups per molecule, and 0 to 60 weight percent of one or more other polymerized monomers, these polymers having a solubility parameter $\delta$ from about 13 to 16 at 25° C. with the proviso that the other monomers comprise less than 5 weight percent of cationic monomers, less than 15 weight percent of free acid monomers, and less than 3 weight percent of metal or ammonium salts of acid monomers.

DESCRIPTION RELATIVE TO THE PRIOR ART

Interlayers have been used in multicolor photographic elements to aid in differential processing of various silver halide emulsions after exposure and to minimize the effects of one layer of the element on another when both are simultaneously undergoing similar treatment as disclosed by Neblett, Photography, "Its Materials and Processes", 1962, Chapter 33. The use of improved interlayers in a multicolor image transfer film unit is well known, as disclosed in U.S. Pat. Nos. 3,411,904 and 3,418,117, both by Becker. The interlayers in many of the known film units act as temporary barriers to isolate the reactants of the surrounded layers for a predetermined length of time.

Image transfer processes are well known in the art which employ a single processing solution to develop an exposed image record and produce a viewable image record.

In certain instances, various barrier layers, timing layers or spacer layers have been used in image transfer film units to delay action between the ingredients of various layers of the image transfer film unit. Barrier layers have been used between polymeric acid layers and the silver halide emulsion layers of an image transfer film unit to allow processing to continue at a high pH for a predetermined period of time before the acid layer becomes effective in neutralizing the processing composition as disclosed in U.S. Pat. No. 2,584,030.

The use of barriers or spacer layers employed in conjunction with neutralizing layers in one commercial image transfer product is described by Friedman, History of Color Photography, 1968, pages 538 through 543. In products of this type, the alkaline composition penetrates through the barrier layer and alkali is depleted throughout the structure by the acid in the neutralizing layers. In certain instances, breakdown of the barrier layers releases materials which serve as a shutoff mechanism, establishing the amount of silver halide development and the related amount of dye formed according to the respective exposure values.

Various barrier layers for these purposes are described in U.S Pat. Nos. 3,362,819; 3,415,644; 3,414,411; 3,785,815; 2,584,030; 3,856,522; 4,056,394; 4,229,516 and 4,061,496, and Canadian Pat. No. 928,559, and British Pat. No. 1,340,349.

Various formats for color diffusion transfer assemblages are described in the prior art, such as U.S. Pat. Nos. 2,543,181; 2,983,606; 3,362,819; 3,362,821; 3,592,645; 3,785,815; 3,415,644; 3,415,645; 3,415,646; 3,647,437; 3,635,707 and 3,756,815, and Canadian Pat. Nos. 928,559 and 674,082. In these formats, the image-receiving layer containing the photographic image for viewing can be separated from the photographic layers after processing or in some embodiments, it can remain permanently attached and integral with the image-generating and ancillary layers present in the structure when a transparent support is employed on the viewing side of the assemblage. The image is formed by color-providing substances released from the image-generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image-generating layers begin to diffuse throughout the structure. At least a portion of the imagewise distribution of color-providing substances diffuse to the dye image-receiving layer to form an image of the original subject.

It has been found that the diffusion rate of alkali through a permeable, inert polymeric barrier layer increases with increasing processing temperature and decreases with decreasing temperature. At relatively high temperatures, this can lead to a premature decrease in the pH of the processing composition resulting in incomplete development. Conversely, at relatively low temperatures, this can lead to a maintenance of the processing composition's high pH for such an extended time that excess dye transfer can occur resulting in poor image discrimination. As a result, barrier layers with a negative activation energy in which the time required for the alkaline processing composition to permeate the layer increases with increasing temperature have been found to be desirable. Barrier layers with negative activation energies are described in U.S. Pat. Nos. 3,455,686; 3,421,893; 3,433,633; 3,419,389; and 3,575,701.

Prior art barrier or timing layers require heat-drying after coating. The specific drying conditions vary with the material chosen to perform as a barrier layer. The drying conditions are generally selected by lengthy trial and error methods to obtain the most uniform coating in the shortest practical time. Special coating machinery may be required to accommodate the coating and drying requirements. If the barrier layer material has limited water solubility, it may have to be coated using an organic solvent. This involves, in addition to the special coating and drying requirements, dangerous solvent evaporation of flammable solvents.

Virtually all photographic systems use gelatin as a vehicle. Because gelatin is used extensively in the photographic industry, it is a distinct advantage that any layer in the element be compatible with aqueous coated layers. Gelatin coatings are useful as they can be spread as aqueous solutions, then immediately chill-set by lowering the temperature, and heat-dried to remove residual water. Aside from avoiding the obvious problem of running off the support, the property of quick-setting is a very important property in photographic coatings to maintain the homogeneity of the layer(s) and in preventing mixing of different layers. However, prior art layers have not been capable of being chill-set. Thus, a synthetic polymer composition, useful as a timing layer, that could be chill-set after coating is desirable as it would be easily coated using machines designed for coating gelatin. The chill-gelable coating must have all the requisites of a barrier layer in addition to being chill-gelable.

SUMMARY OF THE INVENTION

It has now been found that chill-gelable polymers disclosed in copending U.S. application Ser. No. 473,490, filed Mar. 9, 1983 can be used as barrier layers. These polymers can be coated, chill-set, and heat-dried to remove excess water. The polymers comprise about 30 to 97 weight percent of polymerized N-alkyl-substituted acrylamide, about 3 to 25 weight percent of polymerized crosslinking monomer having at least two addition-polymerizable groups per molecule, and 0 to 60 weight percent of one or more other polymerized monomers. These polymers have a solubility parameter o from about 13 to 16 at 25° C. The other polymerized monomers contained in the polymer must comprise less than 5 weight percent of cationic monomers, less than 15 weight percent of free acid monomers, and less than 3 weight percent of metal or ammonium salts of acids. The composition of the layer can be adjusted to provide a range of negative activation energies of penetration by aqueous alkaline solutions.

The barrier layers of the present invention, in addition to being coatable from water and chill-gelable, produce an appropriate timing layer breakdown at room temperature in the range of between 200 and 600 seconds at coverages of 1 to 11 g/m$^2$, have negative to zero activation energy, have timing layer breakdowns that vary with the strength of the processing composition, have no effect on post-process dye density increase, have good incubation stability, have no adverse effect on initial imaging, exhibit a relatively sharp pH drop as a function of time after initial induction period, and can be prepared to have varying degrees of permeability.

A photographic element according to this invention can comprise a support having thereon a temporary barrier layer, said barrier layer comprising a polymer as described above.

The invention also contemplates a photographic element comprising a support, at least one silver halide layer, two or more reactants, and a temporary barrier layer separating at least one reactant of the photographic element from at least one other reactant, said barrier layer comprising the above-described polymer.

In another embodiment of the invention, a photographic element comprises a support, at least one silver halide emulsion layer, a dye image-providing layer, a dye image-receiving layer, and a neutralizing layer, said element containing a temporary barrier layer between the silver halide emulsion layer and the neutralizing layer. The barrier layer comprises the above-described polymer.

In a further embodiment, a photographic film unit comprises a support, at least one photosensitive silver halide layer having associated therewith a dye image-providing layer, a dye image-receiving layer, an alkaline processing composition and means for discharging same within the film unit in contact with the photosensitive layer, and a barrier layer comprising the above-described polymer.

In a further embodiment, a method for coating a barrier layer onto a substrate comprises (a) contacting said substrate with an aqueous dispersion of the above-described polymer, (b) chill setting the coating at a temperature of less than 10° C., and (c) drying the coated support initially at a dry-bulb temperature of greater than 10° C., preferably greater than about 15° C. and less than about 20° C., then gradually increasing the drying temperature to a final wet-bulb temperature of less than 30° C., preferably about 15° to 28° C.

DETAILED DESCRIPTION OF THE PREFERRED EMBODIMENTS

The chill-gelable polymer comprises from about 30 to 97 weight percent of polymerized N-alkyl substituted acrylamide. The preferred acrylamide is N-isopropylacrylamide. Other acrylamides are useful in crosslinked polymers having the requisite solubility parameter. Thus, N-alkyl-substituted acrylamides such as N-n-butylacrylamide, N,N-diethylacrylamide and N-n-propylacrylamide are also useful herein. The most preferred polymers comprise 60 to 97 weight percent of polymerized N-isopropylacrylamide.

The polymer also comprises from about 3 to 25 weight percent of one or more polymerized crosslinking monomers having at least two addition-polymerizable groups per molecule. These crosslinking monomers are generally well known in the art. The preferred crosslinking monomers contain acrylamido or methacrylamido groups to facilitate polymerization with the N-alkyl-substituted acrylamides.

Examples of useful crosslinking monomers include:
N,N'-methylenebisacrylamide;
N,N'-methylenebismethacrylamide;
ethylene dimethacrylate;
2,2-dimethyl-1,3-propylene diacrylate;
divinylbenzene;
mono[2,3-bis(methacryloyloxy)propyl]phosphate;
N,N'-bis(methacryloyl)urea;
triallyl cyanurate;
allyl acrylate;
allyl methacrylate;
N-allylmethacrylamide;
4,4'-isopropylidenediphenylene diacrylate;
1,3-butylene diacrylate;
1,4-cyclohexylenedimethylene dimethacrylate;
2,2'-oxydiethylene dimethacrylate;
divinyloxymethane;
ethylene diacrylate;
ethylidene diacrylate;
propylidene dimethacrylate;
1,6-diacrylamidohexane;
1,6-hexamethylene diacrylate;
1,6-hexamethylene dimethacrylate;
phenylethylene dimethacrylate;
tetramethylene dimethacrylate;
2,2,2-trichloroethylidene dimethacrylate;
ethylenebis(oxyethylene) diacrylate;
ethylenebis(oxyethylene) dimethacrylate;
ethylidyne trimethacrylate;
propylidyne triacrylate;
vinyl allyloxyacetate;
1-vinyloxy-2-allyloxyethane;
2-crotonoyloxyethyl methacrylate;
diallyl phthalate; and
2-(5-phenyl-2,4-pentadienoyloxy) ethyl methacrylate.

The preferred crosslinking monomer is N-N'-methylene-bisacrylamide.

The polymer can also comprise 0 to 60 weight percent of polymerized other monomers with the proviso that said other monomers comprise less than 5 weight percent of cationic monomers, less than 15 weight percent of free acid monomers such as acrylic acid, methacrylic acid, itaconic acid and 2-acrylamido-2-methylpropanesulfonic acid, and less than 3 weight percent of metal or ammonium salts of acid monomers so that the polymer has the requisite solubility.

Exemplary monomers useful herein which are non-ionic include:
acrylamide;
allyl alcohol;
N-methylolacrylamide;
N-(isobutoxymethyl)acrylamide;
N-(isobutoxymethyl)methacrylamide glyceryl methacrylate;
2-hydroxyethyl acrylate;
2-hydroxypropyl acrylate;
N-isopropylacrylamide;
N-vinyl-caprolactam;
N-methylmethacrylamide;
methacrylamide;
maleimide;
2-hydroxyethyl methacrylate;
N-methylolmaleimide;
methacryloylurea;
N-(2-hydroxypropyl)methacrylamide;
N-vinylsuccinimide;
N-vinylphthalimide;
2-hydroxypropyl methacrylate;
N-vinyl-2-pyrrolidone;
2-acrylamido-2-hydroxymethyl-1,3-propanediol;
N,N-dimethylmethacrylamide;
N-methylacrylamide;
N-vinyl-N'-(2-hydroxyethyl)succinamide;
N-vinylcarbazole;
N-isopropylmethacrylamide;
N,N-dimethylacrylamide;
2-ethylhexyl acrylate;
n-butyl acrylate;
methyl acrylate;
methyl methacrylate;
phenyl acrylate;
2-chloroethyl methacrylate;
vinyl acetate;
ethyl acrylate;
ethyl methacrylate; and
styrene.

The useful polymers of the present invention have a solubility parameter $\delta$ from about 13 to 16 at 25° C. The solubility parameter concept is based on regular solution theory and has found many practical applications in polymer science, especially the paint and lacquer industries, as an empirical tool for determining polymer-solvent compatibilities. In particular, the solubility parameter, $\delta$, is related to the Flory-Huggins interaction parameter, $\chi_1$, which determines whether a given polymer-solvent system will exist as a single phase ("solution") or as two phases (solvent phase and "sol" phase).

In the context of microgel-latexes, the single phase would be represented by the microgel and the two-phase system by the latex.

In the solubility parameter theory, the parameters $\delta_1$ (solvent) and $\delta_2$ (solute) are measures of the intermolecular attractions present in the solvent and the amorphous polymers, respectively. For volatile liquids, $\delta_1$ can be experimentally determined. However, $\delta_2$ for non-volatile materials such as polymers is not experimentally accessible and must be estimated. For such materials, a range of $\delta_2$ is estimated by comparison of polymer solubility and solvent solubility parameters. The more similar the solubility parameters, the more likely is dissolution of the polymer. There are also several procedures available for estimating the solubility parameters of polymers from their chemical structures.

There are four recognized types of polymer-solvent interactions. The first, common to all molecules, is called dispersion forces and results from the fluctuation of atomic dipoles because of the presence of a positive nucleus with electrons surrounding it.

The second type of interaction arises because of the presence of permanent dipoles in the interacting molecules. Such dipole-dipole interactions are characteristic of polar molecules. A related (third) type of interaction results when a permanent dipole on one molecule induces a temporary dipole in another to create a relatively weak interaction similar to dipole-dipole interaction.

The fourth type of interaction is that which involves hydrogen bonding. Because hydrogen bonding is relatively poorly understood, the presence of such interactions is often a complicating factor in the analysis of solubility parameter data. In the case of aqueous systems, since the solvent is a constant, it is safe to eliminate all factors due to hydrogen bonding and approach the solubility parameter problem based upon the dispersion forces and dipole interactions involved.

Using the standard literature techniques [see C. M. Hansen, J. Paint Tech., 39 (505), 104–117 (1967)], the solubility parameters of a number of representative co- and terpolymers prepared for latex-microgel application are calculated. In the table below are given the compositions, the solubility parameter, $\delta_2$, and phase condition (microgel or latex) present at the temperature of the calculation (25° C., in this case). Because the solubility parameters vary with temperature, marginal systems will exhibit upper and lower critical solution temperatures, as are exhibited by the N-isopropyl acrylamide polymers. As a result, compositions which are latexes at 25° C. may show microgel formation at lower temperatures (see Table I).

Comparing the $\delta_2$ values of the polymers with their solution characteristics, there exists a region of $\delta_2$ within which the polymers exhibit the latex microgel transition over the normal temperature range (20°-50° C.). In this case, the range of $\delta_2$'s is 13-16. Above 16, the polymer exists as a gel at all temperatures (e.g., poly(N,N-dimethylacrylamide-co-N,N'-methylenebisacrylamide) (90:10), $\delta_2 = 16.3$). Below 13, the polymer remains a latex (e.g., poly(N-n-butylacrylamide-co-methylenebisacrylamide) (90:10), $\delta_2 = 12.81$).

TABLE I

| | | Phase | | |
| Polymer (weight ratio) | $\delta_2$ (25° C.) | Predicted - 25° C. | Observed at 10–25° C. | Remarks* |
|---|---|---|---|---|
| poly(N—isopropylacrylamide-co-N,N'— | 13.7 | Gel | Gel | Latex at 50° C. |

TABLE I-continued

| Polymer (weight ratio) | $\delta_2$ (25° C.) | Phase Predicted - 25° C. | Phase Observed at 10–25° C. | Remarks* |
|---|---|---|---|---|
| methylenebisacrylamide) (90/10) | | | | |
| poly(N—isopropylacrylamide-co-acrylamide-co-N,N'—methylenebisacrylamide) (85/5/10) | 14.6 | " | " | " |
| poly(N—isopropylacrylamide-co-acrylamide-co-N,N'—methylenebisacrylamide) (80/10/10) | 15.4 | " | " | " |
| poly(N—isopropylacrylamide-co-acrylamide-co-N,N'—methylenebisacrylamide) (75/15/10) | 16.2 | | Vis. soln. | Gel at all temp. |
| poly(N—isopropylacrylamide-co-2-hydroxyethyl acrylate-co-N,N'—methylenebisacrylamide) (85/5/10) | 13.6 | Gel | Gel | Latex at 50° C. |
| poly(N—isopropylacrylamide-co-2-hydroxyethyl acrylate-co-N,N'—methylenebisacrylamide) (80/10/10) | 13.6 | Gel | Gel | Latex at 50° C. |
| poly(N—isopropylacrylamide-co-2-hydroxyethyl acrylate-co-N,N'—methylenebisacrylamide) (75/15/10) | 13.6 | " | " | " |
| poly(N—isopropylacrylamide-co-2-hydroxyethyl acrylate-co-N,N'—methylenebisacrylamide) (70/20/10) | 13.6 | " | " | " |
| poly(N—isopropylacrylamide-co-2-hydroxyethyl methacrylate-co-N,N'—methylenebisacrylamide) (85/5/10) | 13.6 | " | " | " |
| poly(N—isopropylacrylamide-co-2-hydroxyethyl methacrylate-co-N,N'—methylenebisacrylamide) (80/10/10) | 13.6 | " | " | " |
| poly(N—isopropylacrylamide-co-2-hydroxyethyl methacrylate-co-N,N'—methylenebisacrylamide) (75/15/10) | 13.5 | Gel | Gel | Latex at 50° C. |
| poly(N—isopropylacrylamide-co-2-hydroxyethyl methacrylate-co-N,N'—methylenebisacrylamide) (70/20/10) | 13.0 | Marginal gel or latex predicted | " | " |
| poly(N—isopropylacrylamide-co-n-butyl acrylate-co-N,N'—methylenebisacrylamide) (85/5/10) | 13.5 | Gel | " | " |
| poly(N—isopropylacrylamide-co-n-butyl acrylate-co-N,N'—methylenebisacrylamide) (80/10/10) | 13.4 | " | " | " |
| poly(N—isopropylacrylamide-co-n-butyl acrylate-co-N,N'—methylenebisacrylamide) (75/15/10) | 13.2 | Marginal gel | " | " |
| poly(N—isopropylacrylamide-co-n-butyl acrylate-co-N,N'—methylenebisacrylamide) (70/20/10) | 13.1 | Probable gel | Vis. soln. (3600 cp at 8–10° C.) | Latex at 50° C. |
| poly[N—isopropylacrylamide-co-N—(2-hydroxypropyl)acrylamide-co-N,N'—methylenebisacrylamide] (85/5/10) | 13.7 | Gel | Polymer not prepared | |
| poly[N—isopropylacrylamide-co-N—(2-hydroxypropyl)acrylamide-co-N,N'—methylenebisacrylamide] (80/10/10) | 13.8 | " | Gel | Latex at 50° C. |
| poly[N—isopropylacrylamide-co-N—(2-hydroxypropyl)acrylamide-co-N,N'—methylenebisacrylamide] (75/15/10) | 13.8 | " | " | " |
| poly[N—isopropylacrylamide-co-N—(2-hydroxypropyl)acrylamide-co-N,N'—methylenebisacrylamide] (70/20/10) | 13.9 | " | " | " |
| poly(N—isopropylacrylamide-co-2-ethylhexyl acrylate-co-N,N'—methylenebisacrylamide) (85/5/10) | 13.6 | Gel | Polymer not prepared | |
| poly(N—isopropylacrylamide-co-2-ethylhexyl acrylate-co-N,N'—methylenebisacrylamide) (80/10/10) | 13.4 | " | Gel | Latex at 50° C. |
| poly(N—isopropylacrylamide-co-2-ethylhexyl acrylate-co-N,N'—methylenebisacrylamide) (75/15/10) | 13.3 | Marginal gel | Polymer not prepared | |

TABLE I-continued

| Polymer (weight ratio) | $\delta_2$ (25° C.) | Phase Predicted - 25° C. | Phase Observed at 10-25° C. | Remarks* |
|---|---|---|---|---|
| poly(N—isopropylacrylamide-co-2-ethylhexyl acrylate-co-N,N'—methylenebisacrylamide) (70/20/10) | 13.2 | Probable gel | Gel | Latex at 50° C. |
| poly(N,N—dimethyacrylamide-co-N,N'—methylenebisacrylamide) (90/10) | 16.3 | Gel | " | Gel at all temp. |
| poly(N,N—diethylacrylamide-co-N,N'—methylenebisacrylamide) (90/10) | 14.3 | " | " | Latex at 50° C |
| poly(N—ethylacrylamide-co N,N'—methylenebisacrylamide) (90/10) | 14.3 | Gel | | Gel at 50° C. |
| poly(N—ethylmethacrylamide co-N,N'—methylenebisacrylamide) (90/10) | 13.1 | Marginal gel | Not prepared | |
| poly(N—n-butylacrylamide-co-N,N'—methylenebisacrylamide) (90/10) | 12.8 | Latex | Latex | |
| poly(N—n-propylacrylamide-co-N,N'—methylenebisacrylamide) (90/10) | 13.1 | Marginal gel | Gel | Latex at 50° C. |
| poly(N—ethyl-N—methylacrylamide-co-N,N'—methylenebisacrylamide) (90/10) | 15.2 | Gel | Not prepared | |
| poly(N,N—dimethylmethacrylamide-co-N,N'—methylenebisacrylamide) (90/10) | 14.8 | " | Gel | Latex at 50° C. |
| poly(N,N—diethylmethacrylamide-co-N,N'—methylenebisacrylamide) (90/10) | 13.4 | Marginal gel | Not prepared | |

*With the exception of poly(N—isopropylacrylamide-co-acrylamide-co-N,N'—methylenebisacrylamide) (75/15/10) and poly(N,N'—dimethylacrylamide-co-N,N'—methylenebisacrylamide), all samples were predicted to be latexes at 50° C.

The above polymer compositions are cross-linked, chill-gelable microgels having a solubility parameter of from 13 to 16 at 25° C. "Chill-gelable microgel" means that in aqueous dispersions the polymer exists above about 50° C. as small latex particles, generally having average diameter of less than about 0.5μ preferably less than about 0.3μ indicative of little swelling, the dispersion thus having low dispersion viscosity typical of latex dispersions; and at temperatures at or below about 10° C. the dispersions are more translucent and are viscous gels of highly swollen polymer having particle sizes above about 0.5μ, generally about 0.8 to 1.1, the gel having a Brookfield viscosity of about at least 1000 cp at 10° C. when the solid content of the dispersion is 8 to 10% or higher.

Preferred polymers described above are those having recurring units having the structure:

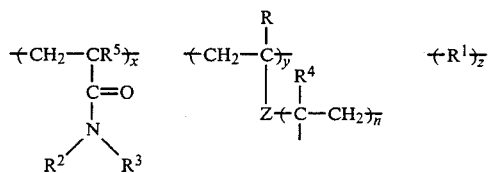

wherein Z is a linking group; R and $R^4$ are individually hydrogen or methyl; $R^1$ represents recurring units in the polymer of one or more polymerized addition polymerizable comonomers; $R^2$ is alkyl of about 1 to 6 carbon atoms or aryl; $R^3$ is hydrogen, aryl or alkyl of about 1 to 6 carbon atoms; $R^5$ is H or $CH_3$; n is 1 or 2; x represents about 30 to 97 weight percent; y represents about 3 to 25 weight percent and z represents about 0 to 30 weight percent; with the proviso that $R^1$ comprises less than 5 percent by weight of the polymer that is derived from cationic monomers, less than about 15 percent by weight of the polymer that is derived from free acid monomers and less than 3 percent by weight of polymer that is derived from metal or ammonium salts of acids.

In the above structure, Z is a linking group between separate polymer backbone chains and can be a heteroatom linking group such as an ester, amide, urylenedicarbonyl, urethane, ether, imino, or the like linking group, or an "n+1" valent nucleus of one or a combination of aliphatic, aromatic, cyclic, and heterocyclic nuclear groups having 0 to n+1 heteroatom linking groups aforementioned, or combinations thereof. Thus, Z has one covalent bond to each ($CH_2$—CR) group present. Preferred nuclei include alkylenebis(iminocarbonyl) such as methylenebis(iminocarbonyl); alkylenebis(oxycarbonyl) such as ethylene-bis(oxycarbonyl), ureylenedicarbonyl; or arylene such as phenylene.

$R^1$ represents recurring units of 1 or more other polymerized addition polymerizable compounds such as previously described.

$R^2$ is a straight or branched chain alkyl of about 1 to 6 carbon atoms, preferably from 1 to 3 carbon atoms, including substituted alkyl such as methyl, ethyl, isopropyl, chloroethyl, butyl and isobutyl.

$R^3$ is hydrogen or a straight or branched chain alkyl as described for $R^2$.

Preferred polymers useful as barrier layers include, poly(N-isopropylacrylamide-co-acrylamide-co-N,N'-methylenebisacrylamide) (70-85:5-20:10), poly(N-isopropylacrylamide-co-2-hydroxyethyl acrylate-co-N,N'-methylenebisacrylamide) (70-85:5-20:10), poly(N-isopropylacrylamide-co-ethylmethacrylate-co-N,N'-methylenebisacrylamide) (70/20/10) and poly(N-isopropylacrylamide-co-ethyl(methacrylate-co-N,N'-methylenebisacrylamide) (70-85:5-20:10). Especially preferred is poly(N-isopropylacrylamide-co-2-hydroxyethylacrylate-co-N,N'-methylenebisacrylamide) (70-85:5-20:10) and poly(N-isopropylacrylamide-co-ethyl methacrylate-co-N,N'-methylenebisacrylamide) (70/20/10).

The above polymers generally have molecular weights of from 100,000 to 1,000,000 and preferably from about 100,000 to 500,000. The particle size of the polymers is preferably about 0.2 to 0.5μ.

The above polymers are formed by randomly polymerizing the monomers together. The polymerization can be carried out using catalysts such as potassium persulfate and 4,4'-azobis-(4-cyanovaleric acid) and heating for a period of 60 minutes to 180 minutes at 60° C. to 80° C. The resulting polymer is hydrophilic and the crosslinking must be done during polymerization, rather than after polymerization to form a latex, i.e. dispersion rather than solution polymer, and attain the chill-gelable microgel properties.

The above polymers are prepared in the form of chill-gelable microgel dispersions by simply polymerizing the selected monomers in aqueous dispersions by conventional emulsion polymerization techniques at elevated temperature, e.g., above about 60° C., preferably at about 70° C. to 80° C. to form a polymer latex, and cooling to ambient temperature. The resulting microgel dispersions preferably contain about 10 to about 20 percent solids.

The microgel dispersions can be coated as barrier layers by conventional aqueous coating procedures, such as curtain coating, roll coating, and other well-known procedures. The preferred coverage for these coated barrier layers ranges from about 0.5 to about 30 g/m$^2$, and preferably from about 3 to about 11 g/m$^2$.

A photographic element according to this invention can comprise a support, preferably at least one silver halide layer, two or more reactants and a temporary barrier layer separating at least one reactant of the photographic element from at least one other reactant, said barrier layer comprising the above-described polymer.

The barrier layers are coated as a microgel dispersion layer in a photographic element. The microgel dispersions are generally coated on a suitable coated or noncoated photographic support such as poly(ethylene terephthalate), glass, or metal and congealing at less than about 10° C., preferably approximately 4.5° C. (chill-gelling), and then air drying at temperatures of about 18° C. The element can be overcoated with a layer or series of layers after chill-gelling and prior to drying.

Various reactants which can be separated by this technique include acids and bases, developing agents and development restrainers, bleaching agents and metallic silver, silver halide and silver halide solvents and the like.

A photographic film unit according to this invention can comprise (a) a support having thereon at least one photosensitive silver halide emulsion layer preferably having, associated therewith a dye image-providing material; (b) an image-receiving layer; (c) alkaline processing composition and means for discharging same within the assemblage; (d) a neutralizing layer for neutralizing said alkaline processing composition; and (e) a barrier layer positioned between the neutralizing layer and said photosensitive silver halide emulsion layer and dye image-providing material, the film unit containing a silver halide developing agent, and wherein said barrier layer comprises the above-described polymer.

A photographic film unit can be manufactured by coating onto a support a neutralizing layer and then a barrier layer of the present invention. The barrier layer can then be chill-set and dried as described hereinabove. A second support is then coated with an image-receiving layer, a light-reflecting layer, and then photosensitive layers having associated therewith dye image-providing materials. The two supports are juxtaposed so the coated sides are contiguous. A rupturable container filled with processing composition is then placed adjacent to the juxtaposed supports in such a manner that a compressive force can be used to discharge the processing composition between the two supports.

In one embodiment according to this invention, the film units are integral negative-receiver color diffusion transfer film units in which the barrier layer of the invention can be employed on a cover sheet as disclosed in Canadian Pat. No. 928,559. In this embodiment, the support for the photosensitive element is transparent and is coated with the image-receiving layer, an opaque light-reflective layer, a black opaque layer and photosensitive layers having associated therewith dye image-providing materials. A rupturable container containing an alkaline processing composition and an opacifier, such as carbon black, is positioned adjacent the top layer and a transparent cover sheet. The cover sheet comprises a transparent support which is coated with a neutralizing layer and the barrier layer of this invention. For further details concerning the format of this particular integral film unit, reference is made to the above-mentioned Canadian Pat. No. 928,559, which is incorporated herein by reference.

Another embodiment of a film unit of an integral color diffusion transfer film unit in which the barrier layer of the invention can be employed in a dye image-receiving element is described in U.S. Pat. No. 3,415,644. This photosensitive element comprises an opaque support which is coated with photosensitive layers having associated therewith dye image-providing material. A rupturable container containing an alkaline processing composition, TiO$_2$ to provide a white viewing background after processing and an indicator dye (see U.S. Pat. No. 3,647,437) is positioned adjacent the top layer and a transparent receiver. The receiver comprises a transparent support which is coated with a neutralizing layer, a barrier layer and an image-receiving layer. For further details concerning the format of this particular film unit, reference is made to the above-mentioned U.S. Pat. No. 3,415,644, which is incorporated herein by reference.

Another embodiment of a color diffusion transfer system in which the barrier system of the invention can be employed in a dye image-receiving element is described in U.S. Pat. No. 3,362,819. The image-receiving element comprises a support, which is usually opaque, having thereon a neutralizing layer, the barrier layer of this invention and a dye image-receiving layer. For further details concerning the use of such an element in color transfer film units, reference is made to the above-mentioned U.S. Pat. No. 3,362,819, which is incorporated herein by reference.

Still other useful integral formats in which this invention can be employed are described in U.S. Pat. Nos. 3,415,634; 3,415,646; 3,647,437; 3,635,707; and 3,594,165, and British Pat. No. 1,330,524.

The photosensitive element useful in this invention can be treated with an alkaline processing composition to effect or initiate development in any manner. A preferred method for applying processing composition is by use of a rupturable container or pod which contains the composition. In general, the processing composition employed in this invention contains the developing agent for development, although the composition could also be just an alkaline solution where the developer is incorporated in the photosensitive element. In such case, the alkaline solution serves to activate the incorporated developer.

The dye image-providing materials which may be employed in this invention generally may be characterized as either (1) initially soluble or diffusible in the processing composition but selectively rendered nondiffusible in an imagewise pattern as a function of development, such as those disclosed, for example, in U.S. Pat. Nos. 2,647,049; 2,661,293; 2,698,244; 2,698,798; 2,802,735; 2,774,668 and 2,983,606, or (2) initially insoluble or nondiffusible in the processing composition but providing a diffusible image dye-providing material as a function of development, such as those disclosed, for example, in U.S. Pat. Nos. 3,227,550, 3,227,551, 3,227,552, 3,227,554, 3,243,294 and 3,445,228. These materials may contain preformed dyes or dye precursors, e.g. color couplers, oxichromic compounds and the like.

In a preferred embodiment of the invention, the dye image-providing material is a ballasted redox dye-releaser. Such compounds are, generally speaking, compounds which can be oxidized, i.e., cross-oxidized, by an oxidized developing agent to provide a species which as a function of oxidation will release a diffusible dye, such as by alkaline hydrolysis. Such redox dye releasers are described in U.S. Pat. Nos. 3,725,062; 3,698,897; 3,628,952; 3,443,939; 3,443,940; 4,076,529; 3,928,312; 3,942,987; 3,932,381; 3,931,144; 4,053,312; 4,055,428; 3,728,113; German Pat. Nos. 2,505,248 and 2,729,820 and *Research Disclosure* Nos. 15157 (November, 1976) and 15654 (April, 1977). Positive working systems include U.S. Pat. Nos. 3,980,479 and 4,139,379 and U.K. Pat. No. 1,464,104.

The term "nondiffusible" as used throughout the specification is intended to mean that the material will not substantially diffuse either within or from the layer in which it is located within the photographic element during contact in an alkaline solution at a pH, for example, of greater than 11. In most cases, the material is ballasted so as to render it nondiffusible. Likewise, the term "diffusible" is intended to mean that the material when in contact with alkaline solution under conditions similar to those described above will substantially migrate from its layer in the photographic element to the image-receiving layer where it is mordanted.

In one preferred embodiment of this invention, the redox dye releasers in U.S. Pat. No. 4,076,529, referred to above are employed. Such compounds are nondiffusible sulfonamido compounds which are alkali-cleavable upon oxidation to release a diffusible sulfonamido dye. For further details concerning the above-described sulfonamido compounds as specific examples of same, reference is made to the above-mentioned U.S. Pat. No. 4,076,529 and Belgian Pat. No. 799,268 issued Feb. 28, 1973, the disclosures of which are hereby incorporated by reference.

In another preferred embodiment of this invention, initially diffusible dye image-providing materials are employed such as dye developers, including metal-complexed dye developers such as those described in U.S. Pat. Nos. 3,482,972, 3,453,207, 3,554,545, 3,552,406, 3,563,739, 3,597,200 and 3,705,184, and oxichromic developers as described and claimed in U.S. Pat. No. 3,880,658, the disclosures of which are hereby incorporated by reference. When oxichromic developers are employed, the image is formed by the diffusion of the oxichromic developer to the dye image-receiving layer where it undergoes chromogenic oxidation to form an image dye.

The film unit of the present invention may be used to produce positive images in single- or multicolors, as well as in black-and-white. In a three-color system, each silver halide emulsion layer of the film assembly will have associated therewith a dye image-providing material capable of providing a dye having a predominant spectral absorption within the region of the visible spectrum to which said silver halide emulsion is sensitive, i.e. the blue-sensitive silver halide emulsion layer will have a yellow dye image providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion layer itself or in a layer contiguous to the silver halide emulsion layer.

The concentration of the dye image-providing materials that are employed in the present invention may be varied over a wide range depending upon the particular compound employed and the results which are desired. For example, the dye image-providing compounds may be coated as dispersions in layers by using coating compositions containing a weight ratio between about 0.25 and about 4 of the dye image-providing compound to the hydrophilic film-forming natural material or synthetic polymer binder, such as gelatin, polyvinyl alcohol, etc., which is adapted to be permeated by aqueous alkaline processing composition.

Generally, most silver halide developing agents can be employed to develop the silver halide emulsions in the photographic elements of this invention. The developer may be employed in the photosensitive element to be activated by the alkaline processing composition. Specific examples of developers which can be employed in this invention are given in *Research Disclosure*, 151, No. 15162, November, 1976.

In using redox dye releaser compounds in this invention, diffusible dye images are produced as a function of development of the silver halide emulsions. If the silver halide emulsion employed forms a direct-positive silver image, a positive image can be obtained on the dye image-receiving ayer when redox releasers are employed which release dye where oxidized. After exposure of the film unit, the alkaline processing composition permeates the various layers to initiate development in the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the redox dye releaser compound, the oxidized form of which either releases directly or undergoes a base-catalyzed reaction to release the preformed dyes or the dye precursors imagewise as a function of the imagewise exposure of each of the silver halide emulsion layer. At least a portion of the imagewise distribution of diffusible dyes or dye precursors diffuses to the image-receiving layer to form a positive image of the original subject.

Internal-image silver halide emulsions useful in the above-described embodiment are direct-positive emulsions that form latent images predominantly inside the silver halide grains, as distinguished from silver halide grains that form latent images predominantly on the surface thereof. Such internal-image emulsions were described by Davey et al in U.S. Pat. No. 2,592,250 issued Apr. 8, 1952, and elsewhere in the literature. Other useful emulsions are described in U.S. Pat. Nos. 3,761,276, 3,761,266 and 3,761,267, all issued Sept. 25, 1973.

The internal-image silver halide emulsions when processed in the presence of fogging or nucleating agents provide direct-positive silver images. Such emulsions are particularly useful in the above-described embodiment. Suitable fogging agents include the hydrazines disclosed by Ives, U.S. Pat. Nos. 2,588,982 issued Mar. 11, 1952 and 2,563,785 issued Aug. 7, 1951; the hydrazides and hydrazones disclosed by Whitmore, U.S. Pat. No. 3,227,552 issued Jan. 4, 1966; hydrazone quaternary salts described in British Pat. No. 1,283,835 and U.S. Pat. No. 3,615,615; hydrazone-containing polymethine dyes described in U.S. Pat. No. 3,718,470; and the fogging agents disclosed in U.S. Pat. Nos. 4,030,925 and 4,031,127 both of Leone et al or mixtures thereof. The quantity of fogging agent employed can be widely varied depending upon the results desired.

Typical useful direct-positive emulsions are disclosed in U.S. Pat. Nos. 3,227,552 by Whitmore issued Jan. 4, 1966, 3,761,276 by Evans issued Sept. 25, 1973, 3,923,513 by Evans issued Dec. 2, 1975, 3,761,267 by Gilman et al, 3,761,266 by Milton, 3,703,584 by Motter, and the like.

In other embodiments, the direct-positive emulsions can be emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well-known in the art and are disclosed, for example, in U.S. Pat. Nos. 3,367,778 by Berriman issued Feb. 6, 1968, and 3,501,305, 3,501,306 and 3,501,307 by Illingsworth, all issued Mar. 17, 1970.

In still other embodiments, the direct-positive emulsions can be of the type described by Mees and James, "The Theory of the Photographic Process," published by MacMillan Company, New York, N.Y., 1966, pp. 149–167.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181, 2,643,886, 2,653,732, 2,734,051, 3,056,492, 3,056,491 and 3,152,515. In general, such containers comprise a rectangular sheet of fluid- and air-impervious material folded longituidinally upon itself to form two walls which are sealed to one another along their longitudinal and end margins to form a cavity in which processing solution is contained.

In a color photographic film unit according to this invention, each silver halide emulsion layer containing a dye image-providing material or having the dye image-providing material present in a contiguous layer may be separated from the other silver halide emulsion layers in the negative portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104, 3,043,692, 3,044,873, 3,061,428, 3,069,263, 3,069,264, 3,121,011 and 3,427,158.

Generally speaking, except where noted otherwise, the silver halide emulsion layers in the invention comprise photosensitive silver halide dispersed in gelatin and are about 0.25 to 5 microns in thickness; the dye image-providing materials are dispersed in an aqueous alkaline solution-permeable polymeric binder, such as gelatin, as a separate layer about 0.25 to 5 microns in thickness; and the alkaline solution-permeable polymeric interlayers, e.g., gelatin, are about 0.25 to 5 microns in thickness. Of course, these thicknesses are approximate only and can be modified according to the product desired.

The alkaline solution-permeable, light-reflective layer employed in certain embodiments of photographic film units of this invention can generally comprise any opacifier dispersed in a binder as long as it has the desired properties. Particularly desirable are white light-reflective layers. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. Brightening agents such as the stilbenes, coumarines, triazines and oxazoles can also be added to the light-reflective layer, if desired. When it is desired to increase the opacifying capacity of the light-reflective layers, dark-colored opacifying agents, e.g., pH-indicator dyes may be added to it, or carbon black, nigrosine dyes, etc., may be coated in a separate layer adjacent the light-reflective layer.

The neutralizing layer employed in this invention, which becomes operative after permeation of the processing composition through the barrier layer or layers, will effect a reduction in the pH of the image layers from about 13 or 14 to at least 11 and preferably 5 to 8 within a short time after imbibition. For example, polymeric acids as disclosed in U.S. Pat. No. 3,362,819 or solid acids or metallic salts, e.g. zinc acetate, zinc sulfate, magnesium acetate, etc., and disclosed in U.S. Pat. No. 2,584,030 may be employed with good results. Such neutralizing or pH-lowering materials reduce the pH of the film unit after development to terminate development and substantially reduce further dye transfer and thus stabilize the dye image.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymer mordants such as polymers of amino guanidine derivatives of vinyl methyl ketone such as described by Minsk, U.S. Pat. No. 2,882,156 issued Apr. 14, 1959, and basic polymeric mordants such as described in U.S. Pat. Nos. 3,709,690, 3,625,694, 3,898,088 by Cohen et al issued Aug. 5, 1975, and 3,859,096 by Burness et al issued Jan. 7, 1975. Other mordants useful in this invention include poly(4-vinylpyridine), poly(1-methyl-2-vinylpyridinium p-toluenesulfonate) and similar compounds described by Sprague et al, U.S. Pat. No. 2,484,430 issued Oct. 11, 1949, and cetyl trimethylammonium bromide, etc. Effective mordanting compositions are also described in U.S. Pat. Nos. 3,271,148 by Whitmore and 3,171,147 by Bush, both issued Sept. 6, 1966, and in 3,958,995 issued May 25, 1976. Other materials useful in the dye image-receiving layer include alkaline solution-permeable polymers such as N-methoxymethyl poly(hexamethylene adipamide), partially hydrolyzed poly(vinyl acetate) and other materials of a similar nature.

The alkaline processing composition employed in this invention is the conventional aqueous solution of an alkaline material, e.g. sodium hydroxide, sodium carbonate or an amine such as diethylamine, preferably possessing a pH in excess of 11, and preferably containing a developing agent as described previously. The solution also preferably contains a viscosity-increasing compound such as a high-molecular-weight polymer, e.g., a water-soluble ether inert to alkaline solution such as hydroxyethyl cellulose or alkali metal salts of carboxymethyl cellulose such as sodium carboxymethyl cellulose. In certain embodiments of this invention, an opacifying agent, e.g. $TiO_2$, carbon black, indicator dyes, etc., may be added to the processing composition.

The support for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethyleneterephthalate) film, polycarbonate film, poly-α-olefins such as polyethylene and polypropylene film, and related films or resinous materials.

The silver halide emulsions useful in this invention are well-known to those skilled in the art and are described in "Product Licensing Index," Volume 92, December, 1971, publication 9232, p. 107, paragraph I, "Emulsion types." They may be chemically and spectrally sensitized as described on p. 107, paragraph III, "Chemical sensitization," of the above article; they can be protected against the production of fog and can be stabilized against loss of sensitivity during keeping by employing the materials described on p. 107, paragraph V, "Antifoggants and Stabilizers," of the above article; they can contain development modifiers, hardeners, and coating aids as described on pp. 107–108, paragraph IV, "Development modifiers"; paragraph VII, "Hardeners"; and paragraph XII, "Coating aids," of the above article; they and other layers in the photographic elements used in this invention can contain plasticizers, vehicles and filter dyes described on p. 108, paragraph XI, "Plasticizers and lubricant," and paragraph VIII, "Vehicles," and p. 109, paragraph XVI, "Absorbing and filter dyes," of the above article; they and other layers in the photographic elements used in this invention may contain addenda which are incorporated by using the procedures described on p. 109, paragraph XVII, "Methods of addition," of the above article; and they can be coated using the various techniques described on p. 109, paragraph XVIII, "Coating procedures," of the above article; the disclosures of which are hereby incorporated by reference.

The barrier layers of the invention can contain addenda such as developer inhibitor precursors or competing developer precursors, which are released only as the layer breaks down. Use of such compounds in barrier layers are described in U.S. Pat. No. 4,009,029.

The following preparations and examples further illustrate the invention:

PREPARATION 1

Preparation of microgel composition comprising poly(N-isopropylacrylamideco-2-hydroxethylacrylate-co-N,N'-methylenebisacrylamide) (70:20:10)

To a 1-liter addition header was added 400 mL of distilled water, 70.0 g of N-isopropylacrylamide, 20.0 g of 2-hydroxyethyl acrylate, 10.0 g of N,N'-methylenebisacrylamide and 8 mL of a 30% solution of Triton ® 770 surfactant. The solution was degassed with nitrogen and the header contents were added over a period of 30 minutes to a solution of 1.00 g of potassium persulfate, 0.20 g of sodium metabisulfite and 8 mL of a 30% solution of Triton ® 770 surfactant in 400 mL of distilled water at 80° C. The resulting latex was stirred at 80° C. under nitrogen for 1 hour and then cooled to 40° C. and dialyzed against distilled water at 40° C. for 16 hours. The latex was then cooled to 25° C. to give a hazy very viscous solution containing 10.3% solids.

EXAMPLE 1

Preparation of cover sheets containing barrier layers of the present invention

A number of processing cover sheets were prepared by coating on a polyester film support a first layer of a copolymer, poly(n-butyl acrylate-co-acrylic acid) (30:70 weight ratio) of 1.4 g/m² which is equal to 140 meq acid/m² and secondly, a barrier layer of various chill-gelable copolymers of the present invention as shown in Table II below. The chill-gelable polymer aqueous coating solutions contained 14.6 percent solids and were each applied via a coating hopper to the polyester support containing the coated acid layer moving at 5400 cm/min. The coated wet layer was congealed at 4.4° C. in the 300 cm vertical rise in the extended setting section of the coating machine. The sheets were then each air dried in a series of driers at various temperatures with a final wet-bulb temperature of 18.3° C. at the dry point. Wet coverages were varied to accommodate the required dry coverage, which was up to 16 g/m² of solids.

The effectiveness of the barrier layer in the cover sheet was measured by determining the "barrier layer breakdown," i.e., the time required to reduce the pH of a simulated laminated film unit to about pH 10 as measured by the color change of the indicator dye thymolphthalein from blue to colorless. The dye was contained in an element which consisted of a gelatin layer containing the thymolphthalein dye coated on a polyester film support. An alkaline solution containing 47 grams per liter of potassium hydroxide was employed in a pod and spread between the element containing the indicator dye and the cover sheet by passing the "sandwich" between a pair of juxtaposed pressure rollers in a manner of processing an integral-imaging-receiver, color image transfer element so that the developer layer thickness was 75 μm.

The "barrier layer breakdown" (Y) reported at each temperature is the average for five samples. The timing for each sample is time interval between lamination and the mean of the time when the indicator dye begins to decolorize and the time when the dye has completely changed color as determined by visual observation. Measurements were made over the range 13° to 60° C. An Arrhenius plot of log Y, representing time (sec), against reciprocal temperature, $1/T(°K.)$, approximated a straight line. The activation energy of the penetration of alkali through the layer (and its subsequent neutralization, $E_a$, the slope of this plot, was calculated from the formula:

$$E_a = 0.00458 \times \frac{\log \frac{Y_2}{Y_1}}{1/T_2 - 1/T_1}$$

$Y_2$ and $Y_1$ representing two values of barrier layer breakdown obtained at two representative temperatures on the line.

Table II shows barrier layer breakdowns in seconds for each barrier layer at various coverages. The activation energy ($E_a$) of each barrier layer is also shown. The A component of each barrier layer polymer is N-isopropylacrylamide. The C component of each barrier layer polymer is N,N'-methylenebisacrylamide. The B component and the weight ratios represented by X, Y, and Z vary between polymers.

TABLE II

| | AxBzCy | | | | | | |
|---|---|---|---|---|---|---|---|
| | $B_z$ | Weight Ratio | TLB (sec) at Given g/m² | | | | Ea |
| Coating | Component | x/z/y | 2.7 | 5.4 | 8.1 | 10.8 | (kcal/mole) |
| 1 | $B_1$ | 87.5/2.5/10 | 150 | 355 | — | 940 | −18 |
| | | 85/5/10 | — | — | — | 340 | −15 |
| 2 | $B_2$ | 85/5/10 | — | — | 55 | 260 | −8 |
| | | 80/10/10 | — | — | 85 | 225 | −8 |
| 3 | $B_3$ | 80/10/10 | 180 | 425 | — | 1100 | −20 |
| | | 75/15/10 | — | 160 | — | 410 | −18 |
| | | 70/20/10 | — | 95 | — | 230 | −12 |
| 4 | $B_4$ | 85/5/10 | 120 | 295 | — | — | −18 |
| | | 80/10/10 | — | 120 | 180 | — | −12 |
| | | 75/15/10 | — | 45 | 55 | — | −7 |
| 5 | $B_5$ | 88/2/10 | 70 | 125 | 175 | — | −10 |
| | | 89/1/10 | 155 | 285 | 405 | — | −10 |
| 6 | $B_6$ | 80/10/10 | 85 | 200 | — | 480 | −10 |
| 7 | $B_7$ | 80/10/10 | 620 | 1200 | — | 1500 | −20 |
| 8 | $B_8$ | 85/5/10 | 220 | 240 | — | 345 | −5 |
| | | 80/10/10 | 50 | 245 | — | 465 | 0 |
| 9 | $B_9$ | 85/5/10 | 255 | 495 | — | — | −18 |
| | | 82.5/7.5/10 | 150 | 275 | — | — | |
| 10 | $B_9$ | 80/5/15 | — | 130 | — | 310 | −5 |
| | | 75/10/15 | — | 135 | — | 250 | −5 |
| | | 75/5/20 | — | 100 | — | 185 | −5 |
| | | 70/15/15 | — | — | — | 160 | −0 |
| | | 70/10/20 | — | — | — | 155 | 0 |
| | | 65/15/20 | — | — | (155 at 16.2) | | 0 |
| 11 | $B_{10}$ | 70/20/10 | 385 | 615 | — | 1300 | −18 |
| 12 | $B_{11}$ | 80/10/10 | 650 | 920 | — | 1200 | −15 |
| 13 | $B_{12}$ | 85/5/10 | 50 | 50 | — | 375 | −10 |
| | | 80/10/10 | 50 | 50 | — | 225 | −10 |
| 14 | $B_{13}$ | 85/5/10 | 200 | 250 | — | — | −10 |
| | | 70/20/10 | 200 | 450 | — | — | −22 |
| 15 | $B_1B_{5a}$ | 85/3,2/10 | — | 70 | — | 175 | −10 |
| 16 | $B_9B_{5a}$ | 80/8,2/10 | — | 85 | — | 185 | −5 |
| 17 | $B_9B_{14}$ | 75/10,5/10 | — | 310 | — | 620 | −12 |
| 18 | $B_{15}$ | 70/20/10 | 65* | 1100 | — | — | −5 |

*This was coated at 2.2 g/m².
$B_1$ Acrylamide
$B_2$ Methacrylamide
$B_3$ N—(2-Hydroxypropyl)methacrylamide
$B_4$ N,N—Dimethylacrylamide
$B_5$ 2-Acrylamido-2-methylpropanesulfonic acid (Na salt)
$B_{5a}$ as $B_5$ but as the free acid
$B_6$ Methyl acrylate
$B_7$ Methyl methacrylate
$B_8$ Phenyl acrylate
$B_9$ 2-Hydroxyethyl acrylate
$B_{10}$ 2-Hydroxyethyl methacrylate
$B_{11}$ 2-Chloroethyl methacrylate
$B_{12}$ Vinyl acetate
$B_{13}$ N—Vinyl-2-pyrrolidone
$B_{14}$ Styrene
$B_{15}$ Ethyl methacrylate
For example, coating 1 is poly(N—isopropylacrylamide-co-acrylamide-co-N,N'—methylenebisacrylamide).

EXAMPLE 2

Sensitometry of film image transfer units containing barrier layers of the present invention Four cover sheets, two containing control barrier layers and the other two, barrier layers of the present invention, were prepared by coating the following layers in the order indicated on a poly(ethylene terephthalate) film support:

(1) an acid layer containing 1.4 g/m² of poly(n-butyl-(acrylate-co-acrylic acid) (70 weight percent acrylic acid); and (2) a barrier layer consisting of 3:2 mixture of poly(acrylonitrile-co-vinylidene chloride-coacrylic acid) (weight ratio of 14:79:7) and carboxyester lactone formed by the cyclization of vinyl acetate-maleic anhydride copolymer in the presence of 1-butanol to produce a partial butyl ester of acid/ester (weight ratio of 15:85), coated at 5.4 g/m² for the control #1 cover sheet layer; or a barrier layer consisting of cellulose acetate (40% acetyl) (10.4 g/m²) and poly(styrene-co-maleic anhydride) (50:50 weight ratio) (0.32 g/m²) as the control #2 cover sheet; or a barrier layer consisting of poly(N-isopropylacrylamide-co-2-hydroxyethylacrylate-comethylene bisacrylamide) (weight ratio of 70:20:10 coated at 27 g/m² for invention cover sheet #1 and 80:10:10 coated at 11 g/m² for invention cover sheet #2).

The cover sheets were used to process a multicolor integral-imaging-receiver element prepared by coating the following layers in the order recited on a transparent poly(ethylene terephthalate) film support (coverages in g/m² unless otherwise specified):

(1) metal containing layer of nickel sulfate.6H₂O (0.58) and gelatin (1.1);
(2) image receiving layer of poly(4-vinylpyridine) (2.2) and gelatin (2.2);
(3) reflecting layer of titanium dioxide (18) and gelatin (2.8);
(4) opaque layer of carbon black (1.9) and gelatin (1.3);
(5) interlayer of gelatin (1.2);
(6) red-sensitive layer of silver bromide (0.65), positive redox dye releaser compound (0.60) having the formula:

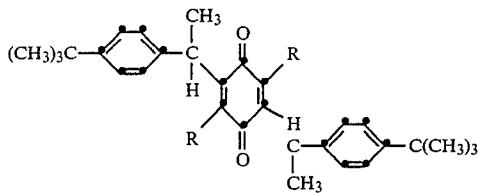

where R is

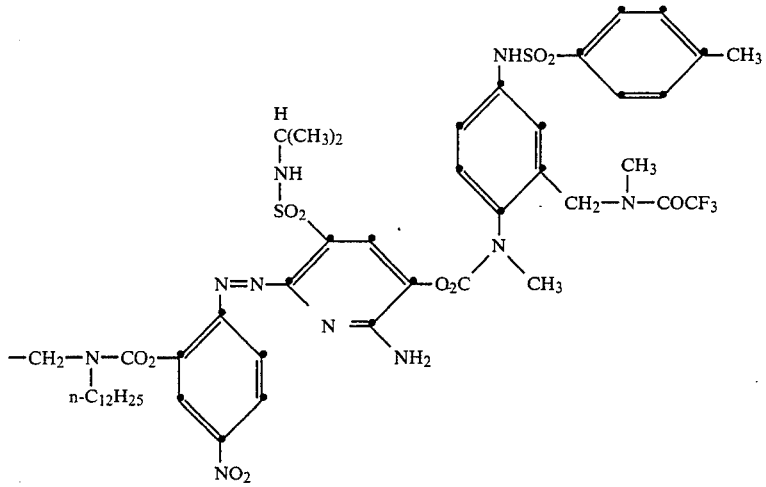

dispersed in diethyllauramide (dye releaser:solvent 2:1), reducing agent (0.50) having the formula:

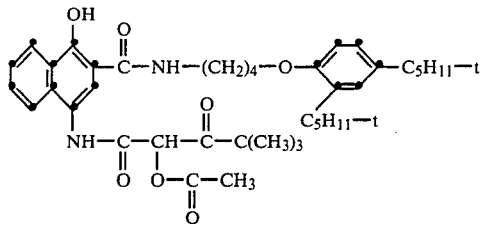

dispersed in diethyllauramide (total solid:solvent 2:1), development inhibitor (0.08) having the formula:

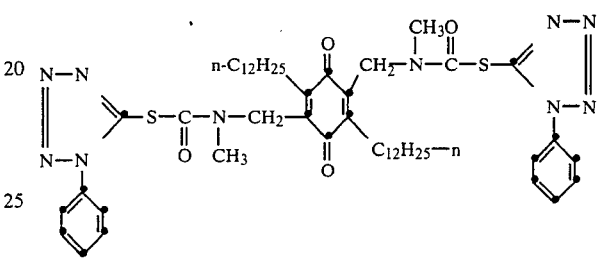

dispersed in diethyllauramide (total solid:solvent 2:1), and gelatin (1.4);
(7) interlayer of 2,5-didodecylhydroquinone (0.63), 2,5-didodecylquinone (0.06), and gelatin (1.0);
(8) green-sensitive layer of silver bromide (0.65), positive redox dye releaser (0.67) having the formula:

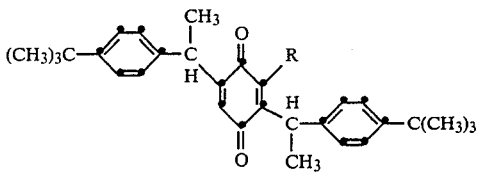

where R is

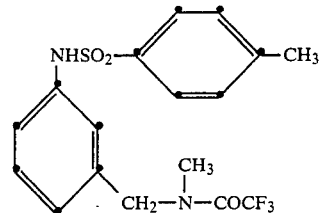

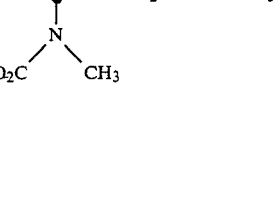

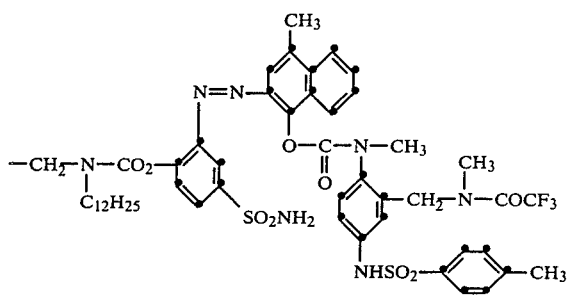

dispersed in diethyllauramide (dye releaser:solvent 2:1), reducing agent (0.33) having the formula described in layer (6) dispersed in diethyllauramide (total solid:solvent 2:1), development inhibitor (0.07) having the formula described in layer (6) dispersed in diethyllauramide (total solid:solvent 2:1), and gelatin (1.5);

(9) interlayer of 2,5-didodecylhydroquinone (0.63), 2,5-didodecylquinone (0.48), and gelatin (0.91);

(10) blue-sensitive layer of silver bromide (0.99), positive redox dye releaser (0.63) having the formula:

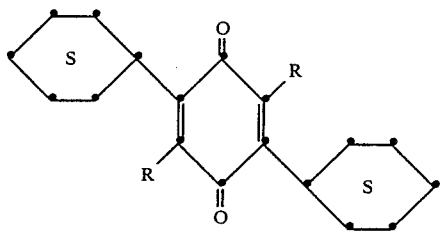

where R is

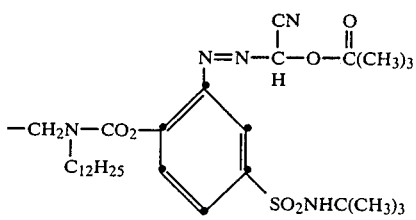

dispersed in diethyllauramide (dye releaser:solvent 2:1), reducing agent (0.32) having the formula as described in layer (6) dispersed in diethyllauramide (total solid:solvent 2:1), development inhibitor (0.03) having the formula described in layer (6) dispersed in diethyllauramide (total solid:solvent 2:1), and gelatin (1.4); and

(11) overcoat of gelatin (0.54).

The above-prepared photosensitive elements were then exposed in a sensitometer through a steptablet to yield a neutral at a Status A density of 1.0, then processed at the temperatures indicated in Table III. The following processing composition was employed in a pod and spread between the photosensitive element and the cover sheet by passing the transfer "sandwich" between a pair of juxtaposed pressure rollers:

| | |
|---|---|
| potassium hydroxide | 51.0 g |
| 4-hydroxymethyl-4-methyl-1-p-tolyl-3-pyrazolidone | 12.0 g |
| potassium bromide | 5.0 g |
| ethylenediaminetetraacetic acid, sodium salt | 10.0 g |
| sodium sulfite | 2.0 g |
| carboxymethylcellulose | 56.0 g |
| carbon | 172.0 g |
| lead oxide | 0.5 g |
| distilled water to total volume | 1 liter |

The sensitometric results listed in Table III were obtained by status A, red, green and blue reflection densitometry read through the film support side within 24 hours after lamination.

TABLE III

| Cover Sheet | Barrier Layer Breakdown (sec) 22.2° C. | | D-max/D-min | | |
|---|---|---|---|---|---|
| | | | 15.6° C. | 22.2° C. | 35.0° C. |
| Invention Cover Sheet 1 | 495 | Red | 2.0/0.23 | 2.1/0.25 | 2.0/0.42 |
| | | Green | 1.7/0.20 | 1.8/0.20 | 1.7/0.28 |
| | | Blue | 1.8/0.21 | 1.9/0.21 | 1.9/0.23 |
| Invention Cover Sheet 2 | 475 | Red | 1.9/0.20 | 2.0/0.24 | 2.0/0.38 |
| | | Green | 1.5/0.18 | 1.8/0.20 | 1.7/0.26 |
| | | Blue | 1.7/0.20 | 1.9/0.21 | 1.9/0.23 |
| Control Cover Sheet 1 | 530 | Red | 2.1/0.21 | 2.1/0.24 | 2.0/0.35 |
| | | Green | 2.0/0.19 | 1.9/0.20 | 1.5/0.24 |
| | | Blue | 2.0/0.20 | 2.0/0.20 | 1.9/0.22 |
| Control Cover Sheet 2 | 490 | Red | 2.1/0.22 | 2.1/0.23 | 2.0/0.40 |
| | | Green | 2.0/0.19 | 1.8/0.19 | 1.6/0.26 |
| | | Blue | 2.0/0.19 | 2.0/0.19 | 1.9/0.24 |

The data in Table III show that with the barrier layer breakdown values adjusted to 500±40 seconds, essentially equivalent sensitometry is obtained with the two cover sheets with barrier layers of the present invention compared to the two cover sheets with prior art barrier layers.

EXAMPLE 3

Chill-gelability of polymers of the present invention

A 14.6 percent solids solution of poly(N-isopropylacrylamide-co-acrylamide-co-N,N'-methylenebisacrylamide) (weight ratio 85/5/10) was prepared according to the present invention. Its viscosity was measured for a variety of temperatures using a Brookfield Viscosimeter. At each designated temperature, a number of viscosity measurements were taken at 30 second intervals and averaged. Similar measurements were taken for 14.6 percent and 5 percent solutions of gelatin, and a 10.3 percent solution of a non-cross-linked polymer, poly(N-isopropylacrylamide-co-acrylamide) (90:10) which is outside the present invention. These measurements are shown in Table IV.

A plot of temperature vs. viscosity indicates that the polymer used in the present invention shows a sharp transition in viscosity in the temperature range of 40°–50° C. The gelatin samples also show a sharp transition in viscosity (CPs) in the temperature ranges of 30°–37° C. for the 14.6 percent solids sample and 22°–28° C. for the 5 percent solids sample. The non-crosslinked polymer solution shows no sharp transition in viscosity indicating the absence of chill-gelability.

TABLE IV

| Temperature °C. | Brookfield viscosity (cp) | | | Poly(N—isopropyl) acrylamide-co-acrylamide (90:10) |
|---|---|---|---|---|
| | Poly(N—isopropylacrylamide-co-acrylamide-co-N,N'—methylenebisacrylamide) (85/5/10) | Gelatin | | |
| | | 5% | 14.6% | |
| 20 | — | >>1000 | — | 37 |
| 22 | — | 200 | — | 33 |
| 25 | — | 17 | — | 28 |
| 30 | — | 8 | >1000 | 19 |
| 32 | — | 7.3 | 400 | 18 |
| 35 | — | 6 | 75 | 15 |
| 38 | >1000 | 5.4 | 55 | 13 |
| 40 | 500 | 5 | 52 | 12 |
| 45 | 15 | 4.5 | 50 | — |
| 50 | 3.5 | 4.2 | 48 | — |

The invention has been described in detail with particular reference to preferred embodiments thereof, but it will be understood that variations and modifications can be effected within the spirit and scope of the invention.

What is claimed is:

1. A photographic element having thereon at least one dye imaging layer, a neutralizing layer, and a chill-gelable temporary barrier layer separating said dye imaging reactant layer from said neutralizing layer, said chill-gelable barrier layer comprising a chill-gelable polymer comprising about 30 to 97 weight percent of polymerized N-alkyl-substituted acrylamide, about 3 to about 25 weight percent of polymerized crosslinking monomer having at least two addition-polymerizable groups per molecule and about 0 to about 60 weight percent of one or more other polymerized addition-polymerizable monomers, said polymer having a solubility parameter $\delta$ from about 13 to 16 at 25° C. with the proviso that said monomers comprise less than 5 weight percent of cationic monomers, less than 15 weight percent of free acid monomers, and less than 3 weight percent of metal or ammonium salts of acid monomers.

2. The photographic element of claim 1 wherein said polymer has recurring units having the structure:

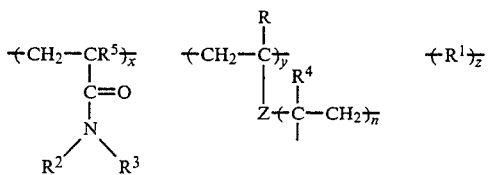

wherein Z is a linking group; R and $R^4$ are individually hydrogen or methyl; $R^1$ represents recurring units in the polymer of one or more addition polymerizable comonomers; $R^2$ is alkyl of about 1 to 6 carbon atoms or aryl; $R^3$ is hydrogen, aryl, or alkyl of about 1 to 6 carbon atoms; $R^5$ is H or $CH_3$; n is 1 or 2; x represents about 30 to 97 weight percent; y represents about 3 to 25 weight percent; and z represents about 0 to 30 weight percent with the proviso that said monomers comprise less than 5 weight percent of polymer that is derived from cationic monomers, less than 15 weight percent of said polymer that is derived from free acid monomers, and less than 3 weight percent of said polymer that is derived from monomers that contain metal or ammonium salts of acid monomers.

3. In a photographic element comprising a support, at least one silver halide layer, at least one dye imaging layer, at least one neutralizing layer, and a temporary barrier layer separating said dye imaging layer from said neutralizing layer, the improvement wherein said barrier layer is chill-gelable and comprises a chill-gelable polymer comprising about 30 to 97 weightpercent of polymerized N-alkyl-substituted acrylamide, about 3 to about 25 weight percent of polymerized crosslinking monomer having at least two addition-polymerizable groups per molecule and about 0 to about 60 weight percent of one or more other polymerized addition-polymerizable monomers, said polymer having a solubility parameter $\delta$ from about 13 to 16 at 25° C. with the proviso that said monomers comprise less than 5 weight percent of cationic monomers less than 15 weight percent of free acid monomers, and less than 3 weight percent of metal or ammonium salts of acid monomers.

4. The photographic element of claim 3 wherein said polymer has recurring units having the structure:

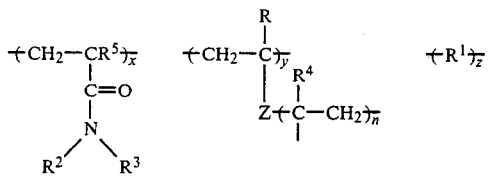

wherein Z is a linking group; R and $R^4$ are individually hydrogen or methyl; $R^1$ represents recurring units in the polymer of one or more addition polymerizable comonomers; $R^2$ is alkyl of about 1 to 6 carbon atoms or aryl; $R^3$ is hydrogen, aryl, or alkyl of about 1 to 6 carbon atoms; $R^5$ is H or $CH_3$; n is 1 or 2; x represents about 30 to 97 weight percent; y represents about 3 to 25 weight percent; and z represents about 0 to 30 weight percent with the proviso that said monomers comprise less than 5 weight percent of polymer that is derived from cationic monomers, less than 15 weight percent of said polymer that is derived from free acid monomers, and less than 3 weight percent of said polymer that is derived from monomers that contain metal or ammonium salts of acid monomers.

5. The photographic element of claim 4 wherein Z is selected from the group consisting of alkylenebis(iminocarbonyl), alkylenebis(oxycarbonyl), and arylene.

6. The photographic element of claim 3 wherein the N-alkyl-substituted acrylamide is isopropylacrylamide.

7. The photographic element of claim 3 wherein said polymer has a molecular weight of from about 100,000 to 1,000,000.

8. The photographic element of claim 3 wherein said polymer is poly(N-isopropyl)acrylamide(co-2-hydroxyethyl acrylate-co-N,N'-methylenebisacrylamide) (70:20:10 by weight).

9. The photographic element of claim 8 wherein the weight ratio is 80:10:10.

10. In a photographic element comprising a support, at least one silver halide emulsion layer, a dye image-providing layer, a dye image-receiving layer, and a neutralizing layer, said element containing a temporary barrier layer having a negative activation energy and being located between said neutralizing layer and said silver halide emulsion layer, said neutralizing layer providing a pH of 11 or less to the silver halide emulsion layer, the improvement wherein said barrier layer is chill-gelable and comprises a chill-gelable polymer comprising about 30 to 97 weight percent of polymerized N-alkyl-substituted acrylamide, about 3 to about 25 weight percent of polymerized crosslinking monomer having at least two addition-polymerizable groups per molecule and about 0 to about 60 weight percent of one or more other polymerized addition-polymerizable monomers, said polymer having a solubility parameter $\delta$ from about 13 to 16 at 25° C. with the proviso that said monomers comprise less than 5 weight percent of cationic monomers, less than 15 weight percent of free acid monomers, and less than 3 weight percent of metal or ammonium salts of acid monomers.

11. The photographic element of claim 10 wherein said polymer has recurring units having the structure:

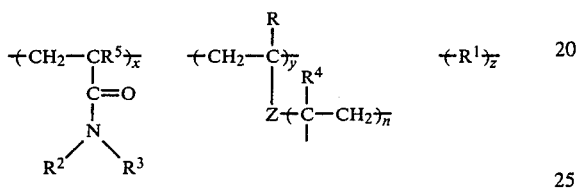

wherein Z is a linking group; R and $R^4$ are individually hydrogen or methyl; $R^1$ represents recurring units in the polymer of one or more addition polymerizable comonomers; $R^2$ is alkyl of about 1 to 6 carbon atoms or aryl; $R^3$ is hydrogen, aryl, or alkyl of about 1 to 6 carbon atoms; $R^5$ is H or $CH_3$; n is 1 or 2; x represents about 30 to 97 weight percent; y represents about 3 to 25 weight percent; and z represents about 0 to 30 weight percent with the proviso that said monomers comprise less than 5 weight percent of polymer that is derived from cationic monomers, less than 15 weight percent of said polymer that is derived from free acid monomers, and less than 3 weight percent of said polymer that is derived from monomers that contain metal or ammonium salts of acid monomers.

12. The photographic element of claim 11 wherein Z is selected from the group consisting of alkylenebis(iminocarbonyl), alkylenebis(oxycarbonyl), and arylene.

13. The photographic element of claim 10 wherein the N-alkyl-substituted acrylamide is isopropylacrylamide.

14. The photographic element of claim 10 wherein said polymer has a molecular weight of from about 100,000 to 1,000,000.

15. The photographic element of claim 10 wherein said polymer is poly(N-isopropyl)acrylamide(co-2-hydroxyethyl acrylate-co-N,N'-methylenebisacrylamide) (70:20:10 by weight).

16. The photographic element of claim 15 wherein the weight ratio is 80:10:10.

17. In a photographic film unit comprising:
(a) a support having thereon at least one photosensitive silver halide emulsion layer having associated herewith a dye-image-providing layer;
(b) a dye image-receiving layer;
(c) alkaline processing composition and means for discharging same within said film unit in contact with said photosensitive layer;
(d) a neutralizing layerfo rneutralizing said alkaline processing composition; and
(e) a barrier layer having a negative activation energy of penetration by an aqueous alkaline solution, and which is permeable by said alkaline processing composition after a predetermined time located between said neutralizing layer and said photosensitive silver halide emulsion, said film unit containing a silver halide developing agent, said neutralizing layer providing a pH of 11 or less to the silver halide emulsion layer upon breakdown of said barrier layer, the improvement wherein said barrier layer is chill-gelable and comprises a chill gelable polymer comprising about 30 to 97 weight percent of polymerized N-alkyl-substituted acrylamide, about 3 to about 25 weight percent of polymerized crosslinking monomer having at least two addition-polymerizable groups per molecule and about 0 to about 60 weight percent of one or more other polymerized addition-polymerizable monomers, said polymer having a solubility parameter $\delta$ from about 13 to 16 at 25° C. with the proviso that said monomers comprise less than 5 weight percent of cationic monomers, less than 15 weight percent of free acid monomers, and less than 3 weight percent of metal or ammonium salts of acid monomers.

18. The photographic film unit of claim 17 wherein:
(a) said dye-image receiving layer is located between said support and said silver halide emulsion layer; and
(b) said film unit also includes a transparent cover sheet over the layer outermost from said support.

19. The film unit of claim 18 wherein said transparent cover sheet contains in order, said neutralizing layer and said barrier layer.

20. The film unit of claim 18 wherein said discharging means is a rupturable container containing said alkaline agent, said container being so positioned during processing of said film unit that a compressive force applied to said container will effect a discharge of the container's contents between said cover sheet and the outermost layer of said photosensitive element.

21. The film unit of claim 17 comprising:
(a) a photosensitive element comprising a transparent support having thereon the following layers in sequence: an image-receiving layer; an alkaline solution-permeable, light-reflective layer; an alkaline solution-permeable opaque layer; a red-sensitive silver halide emulsion layer having a ballasted redox cyan dye-releaser associated therewith; a green-sensitive silver halide emulsion having a ballasted redox magenta dye-releaser associated therewith; and a blue-sensitive silver halide emulsion layer having a ballasted redox yellow dye-releaser associated therewith;
(b) a cover sheet superposed over said blue-sensitive silver halide emulsion layer and comprising a transparent support coated with said neutralizing layer and said barrier layer; and
(c) a rupturable container containing an alkaline processing composition and an opacifying agent, said container being so positioned during processing of said film unit that a compressive force supplied to said container will effect a discharge of the container's contents between said cover sheet and said blue-sensitive silver halide emulsion layer.

22. The film unit of claim 17 wherein said dye image-receiving layer is located on one support and said photosensitive silver halide emulsion layer is located on another support.

* * * * *